днуunited States Patent Office 3,562,313
Patented Feb. 9, 1971

3,562,313
INTERMEDIATES FOR BENZOIC ACID LACTONES
Alexander D. Cross, c/o Syntex International, A.T.S.A., Apartado Postal M–10063, Mexico City 1, Mexico, and John H. Fried and Ian T. Harrison, both c/o Syntex Research, 3401 Hillview Ave., Palo Alto, Calif. 94304
No Drawing. Continuation-in-part of application Ser. No. 560,851, June 27, 1966. This application May 6, 1968, Ser. No. 727,085
Int. Cl. C07c 65/02, 69/76
U.S. Cl. 260—473    3 Claims

ABSTRACT OF THE DISCLOSURE

Novel benzoic acid ketones and hydroxy ketones which are intermediates of benzoic acid lactones useful as estrogenic and anabolic agents.

---

This application is a continuation-in-part of U.S. application No. 560,851 filed June 27, 1966.

This invention relates to a process for the preparation of organic compounds and to certain novel intermediates thereof.

More particularly, this invention is directed at the novel synthesis of benzoic acid lactones represented by the following skeletal formula:

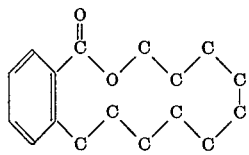

The compounds of this invention demonstrate hormonal properties characteristic of estrogenic agents and are thus useful in the treatment of estrogen deficiencies, in fertility regulation, and in the management of various menstrual disorders.

These compounds are also active anabolic agents and are thus useful in the treatment of debilatory conditions, such as are encountered in advanced age, post-operative recuperation, and the like. They are useful as a supplement in likestock feeds such as feeds of swine, lamb and cattle, to increase consumption with resultant increasing rate of growth, fattening and improved appearance. In addition, the compounds of this invention possess antibiotic, antifungal, and other activities usually associated with certain synthetic or naturally occurring derivatives.

The benzoic acid lactones represented by the above skeletal formula are prepared in accordance herewith via a sequence of steps from 2-formylbenzoic acid esters, which are prepared from the corresponding 2-methylbenzoic acid esters, and 5,9-diketal-1-alkyltriphenylphosphonium halides or phosphoranes thereof, which are prepared from the corresponding 5-oxoalk-1-ene and alkyl vinyl ketone.

In the practice of the principal preferred aspects of this process, a 2-formylbenzoic acid ester is condensed with a 5,9-diketal-1-alkyltriphenylphosphonium bromide to give the corresponding alkyl 2-(6',10'-bisketal alk-1'-enyl)-benzoate. The application of this process thus makes possible the substitution of an aliphatic hydrocarbon chain on the benzoic acid ring at the formyl function with concomitant formation of double bond unsaturation adjacent to the juncture. Thereafter, the condensation product is lactonized under preferred conditions described hereafter.

A representative class of the above depicted and described benzoic acid lactones is typified by Formula I as follows:

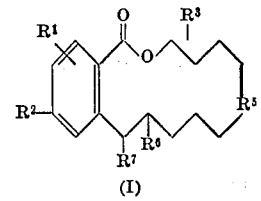

(I)

wherein each of $R^1$ (at position C–6) and $R^2$ is hydrogen, hydroxy, alkoxy, cyclopentyloxy, tetrahydrofuran-2'-yloxy, tetrahydropyran-2'-yloxy, benzyloxy or hydrocarbon carboxylic acyloxy of less than 12 carbon atoms; or $R^1$ (at position C–5) and $R^2$ taken together are 4,5-benzo; $R^3$ is (lower)alkyl;
$R_5$ is one of groups

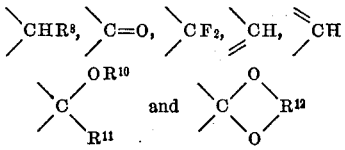

each of $R^6$, $R^7$ and $R^8$ are hydrogen; or $R^6$ and $R^8$ taken together are —O—; or $R^6$ and $R^7$ taken together are a carbon-carbon double bond; $R^{10}$ is hydrogen, cyclopentyl, tetrahydrofuran-2'-yl, tetrahydropyran-2'-yl, or hydrocarbon carboxylic acyl of less than 12 carbon atoms; $R^{11}$ is hydrogen; (lower)alkyl, (lower)alkenyl, (lower) alkynyl, or halo(lower)alkynyl; and $R^{12}$ is methylene, ethylene, 1,2-propylene, or trimethylene.

By the terms "(lower)alkyl," "(lower)alkenyl," and "(lower)alkynyl" are intended branched or straight chain hydrocarbon groups of six or less carbon atoms. Representations of such (lower)alkyl groups are thus methyl, ethyl, propyl, isopropyl, butyl, pentyl, and hexyl; of such (lower)alkenyl groups are vinyl, propenyl, and the like; of such (lower)alkynyl groups are ethynyl, propynyl, and the like; and of such halo(lower)-alkynyl groups are chloroethynyl, and the like.

The hydrocarbon carboxylic acyloxy groups of the present invention will contain less than 12 carbon atoms and may be of a straight, branched, cyclic or cyclic-aliphatic chain structure. These may be saturated, unsaturated or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

Particularly valuable compounds of these represented by Formula I above are 2-(6'-keto-10'-hydroxyundec-1'-enyl)-4,6-dihydroxybenzoic acid-10'-lactone and 2-(2',6'-oxido - 10' - hydroxyundecyl)-4,6-dihydroxybenzoic acid-10'-lactone and the 4,6-diethers and esters thereof respectively represented hereinafter by structural formulas X and XIV respectively. The compound of formula X can be prepared by the present novel process according to the following general reaction scheme A.

Scheme A

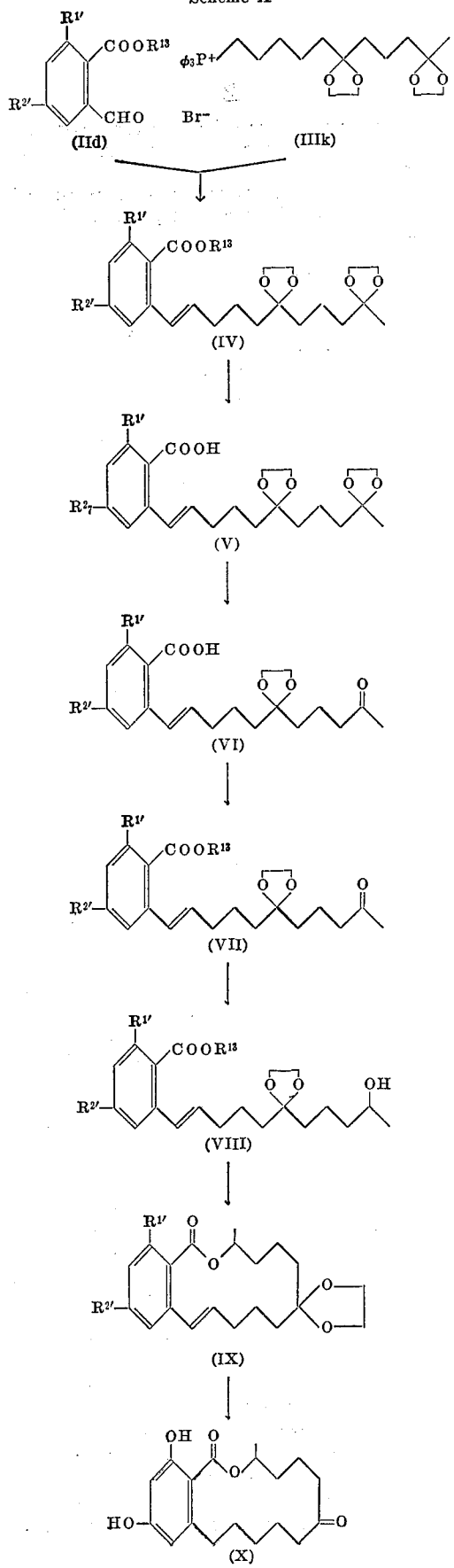

Wherein each of $R^{1'}$ (at position C-6) and $R^{2'}$ is hydrogen, alkoxy, tetrahydrofuran-2'-yloxy, tetrahydropyran-2'-yloxy, cyclopentoxy or benzyloxy (alkoxy being the preferred grouping); and $R^{13}$ is (lower)alkyl. Preferably $R^{13}$ is methyl or ethyl. $\phi$ represents a phenyl group.

The process of Scheme A comprises:

(a) Coupling a 2-formyl benzoic acid ester, such as the compound of Formula IId, with a 5,9-diketal-1-alkyltriphenyl phosphonium halide, in which the halide is selected from the group consisting of chloride, bromide or iodide, such as the compound of Formula IIIk, via the present novel coupling reaction to give the corresponding 2-(6',10'-bisketalalk-1'-enyl) benzoic acid ester, such as a compound of Formula IV;

(b) Subjecting the above 2-(6'-10'bisketalalk-1'-enyl) benzoic acid ester, such as the compound of Formula IV, sequentially to a basic ester hydrolysis, a selective 10'-ketal acid hydrolysis, a carboxy esterification and a selective 10'-oxo reduction with sodium borohydride to give the corresponding 2 - (6' - ketal-10'-hydroxyalk-1'-enyl) benzoic acid ester such as a compound of Formula VIII; and (c) Subjecting the thus prepared 2-(6'-ketal-10'-hydroxyalk-1'-enyl) benzoic acid ester, such as a benzoic acid ester of Formula VIII, to lactonization to give the corresponding 2-(6'-ketal-10'-hydroxyalk-1'-enyl) benzoic acid-10'-lactone, such as the compound of Formula IX.

The compound of Formula IV, a ethyl 2-[6',6'; 10',10'-bisethylenedioxyundec-1'-enyl]-4,6-bisether benzoic acid ester, is prepared by coupling approximately equal molar quantities of a compound of Formula IIIk, a 5,5;9,9-bisethylenedioxy - 1 - decyltriphenyl phosphonium bromide, and a compound of Formula IId, a 2-formyl-4,6-bisether benzoic acid ester, preferably ethyl 2-formyl-4,6-dimethoxy benzoate. The coupling is carried out in an aprotic organic solvent with a high dielectric constant in the presence of an alkali metal tert-alkoxide, such as sodium t-pentoxide, potassium t-butoxide, and the like. At least a molar equivalent of the alkali metal tert-alkoxide is used per molar equivalent of the reactants. The coupling is carried out at temperatures between —10° C. and 100° C., conveniently at room temperature. Typical aprotic organic solvents with a high dielectric constant, that is a dielectric constant of 35 or greater, employed in the above reaction include dimethylsulfoxide, dimethylformamide, N,N-dimethylacetamide, and the like.

The compound of Formula VIII, a 2-(6',6'-ethylenedioxy - 10' - hydroxyundec - 1' - enyl) - 4,6-bisether benzoic acid ester, is prepared by first hydrolyzing the novel compound of Formula IV with an aqueous alkali metal hydroxide-tetra-hydrofuran solution such as an aqueous sodium hydroxide-tetrahydrofuran solution, or the like, to obtain the corresponding novel benzoic acid of Formula V, a 2 - (6',6';10',10' - bisethylenedioxyundec-1' - enyl) - 4,6 - bisether benzoic acid. The hydrolysis is carried out at a temperature between 0° C. and 100° C., conveniently at room temperature. Secondly, the thus prepared benzoic acid is selectively hydrolyzed with an aqueous mixture containing an acid catalyst, such as p-toluenesulfonic acid, sulfuric acid and the like, to furnish the corresponding 10'-keto benzoic acid of Formula VI, a 2 - (6',6' - ethylenedioxy - 10' - ketoundec - 1' - enyl)-4,6-bisether benzoic acid. The acid hydrolysis is conducted at a temperature between 0° C. and 100° C., conveniently at room temperature. Under these described conditions, the 10'-ketal is selectively hydrolyzed and the 6'-ketal is not hydrolyzed. Thirdly, the thus prepared 10'-keto benzoic acid is esterified with a diazoalkane, such as diazomethane, diazoethane, and the like, in an inert organic solvent, such as diethyl ether to furnish the corresponding 10'-keto benzoic acid ester of formula VII, a 2 - (6',6' - ethylenedioxy - 10' - ketoundec-1'-enyl)-4,6-bisether benzoic acid ester. Lastly, the thus prepared 10'-keto benzoic acid ester is selectively reduced with at least a molar equivalent of sodium borohydride to give the corresponding 10'-hydroxy benzoic acid ester of Formula VIII.

The compound of Formula IX, 2 - (6',6'-ethylenedioxy-10' - hydroxyundec - 1' - enyl)-4,6-bisether benzoic acid-10'-lactone is prepared from the corresponding compound of Formula VIII via a noval lactonizing reaction. The lactonization is carried out by distilling liberated alkanol from a mixture comprising the benzoic acid ester of Formula VIII, an alkali metal, a tert-alkanol and an inert organic solvent or mixture of solvents. The alkanol is liberated from the benzoic acid ester of Formula VIII during the lactonization. That is, the carboxy ester group of the benzoic acid ester is cleaved in the reaction mixture to give the free carboxy group and the free alkanol of the carboxy ester group.

Preferably the alkali metal and an excess of tert-alkanol are added together to prepare an alkali metal tert-alkoxide-tert-alkanol mixture. After the resulting reaction between the metal and alcohol, the inert organic solvent and the benzoic acid ester of Formula VIII are added to the above mixture to give the reaction mixture. An inert organic solvent or mixture of solvents is employed that has a boiling point greater than the boiling point of the liberated alkanol; preferably a boiling point 30 degrees (centigrade) higher. Typical inert organic solvents include hydrocarbons such as benzene, toluene, xylene, cumene, dimethyl cyclohexane, decane, and the like.

The distillation is carried out for a period of time between about ½ hour and about 24 hours and preferably between 4 hours and 8 hours. During the distillation period, between about 1/20 and about 3/4 of the initial solvent is removed by distillation. Optionally, fresh solvent can be added continuously or intermittently during the distillation; in such cases, more than 3/4 of initial solvent volume can be removed by distillation.

The compound of Formula X, a 2 - (6'-oxo-10'-hydroxyundec - 1' - enyl) - 4,6 - dihydroxy benzoic acid-10'-lactone is prepared by hydrolyzing the corresponding 4,6-bisether compound of Formula IX. The hydrolysis can be conducted via conventional techniques, such as refluxing in aqueous 48% hydrogen bromide: acetic acid, or treating it with borontribromide in an inert organic solvent, as for example methylene chloride.

By using other 5,9 - bisketal - 1 - alkyltriphenyl phosphonium halides in place of the compound of Formula IIIk, and other 2-formyl benzoic acid esters, such as 2-formyl benzoic acid esters where $R^{1\prime}$ (at position C–5) and $R^{2\prime}$ taken together are 4,5-benzo, in place of the compound of Formula IId, other novel 2 - (6' - ketal - 10'-hydroxyalk - 1' - enyl) benzoic acid-10'-lactones can be prepared. For example, 2 - (6',6'-ethylenedioxy - 10'-hydroxydodec-1' - enyl - 4,5 - benzobenzoic acid 10'-lactone is prepared from 5,5;9,9 - bisethylenedioxy - 1-undecyltriphenyl phosphonium bromide and 2 - formyl-4,5-benzobenzoic acid via the process of Scheme A. The corresponding intermediates thereto are also prepared.

Alternatively, the compounds of formula IX can be prepared by the following reaction Scheme B employing the compounds of Formula VI, a 2 - (6',6'-ethylenedioxy-10' - oxoundec - 1' - enyl) - 4,6-disether benzoic acid, as starting materials.

Scheme B (VI)

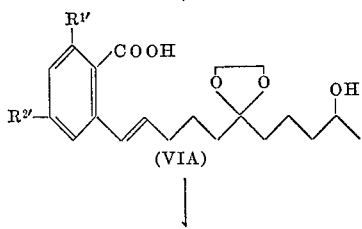

(VIA)

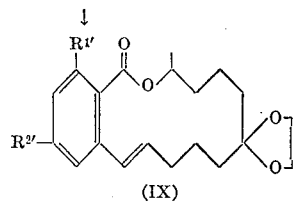

(IX)

wherein $R^{1\prime}$ and $R^{2\prime}$ are defined above.

The compound of Formula VIA, a 2-(6',6'-ethylenedioxy-10'-hydroxyundec-1'-enyl)-4,6-bisetherbenzoic acid, is prepared by selectively reducing the compound of Formula VI with sodium borohydride. The compound of Formula VIA is lactonized, via a novel process, by treatment with a carbodiimide, preferably a N,N'-dialkylcarbodiimide such as dicyclohexylcarbodiimide, and pyridine, at temperatures from about 0° C. to about 100° C.

Alternatively, the lactonization of the compounds of Formula VIA can be carried out by treatment with sulfonyl chlorides, such as p-toluenesulfonyl chloride and the like; with acid anhydrides such as acetic anhydride, trifluoroacetic anhydride and the like; with organic bases such as pyridine, quinoline, guanidine and the like.

2-(6'-ketal-10'-oxoalk-1'-enyl)-benzoic acids other than the compounds of Formula VI can be employed in the process of Scheme B. For example, 2-(6',6'-ethylenedioxy-10'-oxo-11'-methyldodec-1'-enyl) - 4,5 - benzobenzoic acid can be employed in the above process to give 2-(6', 6' - ethylenedioxy-10'-hydroxy-11'-methyldodec-1'-enyl)-4,5-benzobenzoic acid 10'-lactone.

The novel compounds of Formula XIV, which are the compounds of Formula I wherein each of $R^1$ (at position C–6) and $R^2$ is hydrogen, alkoxy, tetrahydrofuran-2'-yloxy, tetrahydropyran-2'-yloxy, cyclopentoxy or benzyloxy; $R^3$ is methyl; $R^5$ is $CHR^8$; $R^6$ and $R^8$ taken together are —O—; and $R^7$ is hydrogen, are prepared via a novel process from the compounds of Formula IV according to the following reaction Scheme C.

Scheme C

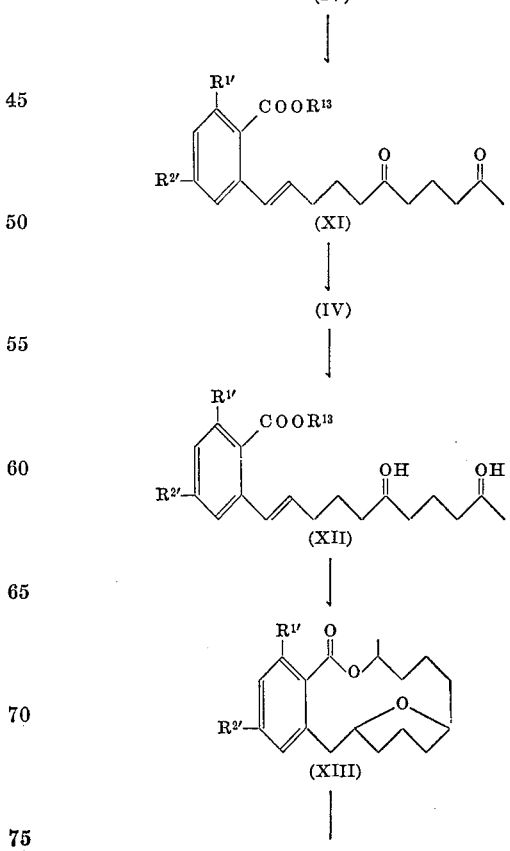

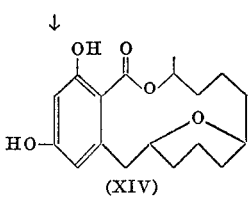

(XIV)

wherein $R^{1'}$, $R^{2'}$ and $R^{13}$ are as defined above.

The novel diketo compound of Formula XI, a 2-(6',10'-dioxoundec-1'-enyl) benzoic acid ester, is prepared from the corresponding compound of Formula IV, a 2-(6',6'; 10',10'-bisethylenedioxyundec-1'-enyl) benzoic acid ester, by an acid hydrolysis of the latter in an aqueous mixture in the presence of an acid catalyst, such as p-toluenesulfonic acid.

The novel dihydroxy compound of Formula XII, a 2-(6',10'-dihydroxyundec-1'-enyl) benzoic acid ester, is prepared from the corresponding diketo compound of Formula XI by selectively reducing the latter with sodium borohydride.

The novel 2',6'-oxido benzoic acid-10'-lactone of Formula XIII, a 2-(2',6'-oxido-10'-hydroxyundec-1'-enyl) benzoic acid-10'-lactone, is prepared by lactonizing the corresponding dihydroxy compound of Formula XII via a novel process which is practiced by distilling a liberated alkanol from a mixture comprising the compound of Formula XII, an alkali metal tert-alkoxide or alkali metal hydride, such as sodium hydride, and an inert organic solvent, such as a hydrocarbon. The alkanol is liberated when the carboxy ester group is cleaved in the reaction mixture prior to the lactonization. The reaction mixture is distilled for a period between 12 hours and 100 hours or longer, preferably about 24 hours, and $\frac{1}{10}$ to $\frac{3}{4}$ of the solvent is removed by distillation, preferably $\frac{1}{4}$ to $\frac{1}{2}$ of the solvent is distilled off.

When the compounds of Formula XIII have ether groups they can be cleaved by acid hydrolysis, such as with 48% hydrogen bromide:acetic acid, or boron tribromide in inert solvents, to the corresponding compound of Formula XIV, a 2-(2',6'-oxido-10'-hydroxyundec-1'-enyl)-4,6-dihydroxy benzoic acid-10'-lactone.

2-(6',10'-bisketalalk-1'-enyl) benzoic acid esters other than those of Formula IV can be employed in the process of Scheme C to obtain other corresponding 2-(2',6'-oxido-10'-hydroxyalkyl benzoic acid-10'-lactones and derivatives theretofore. For example, 2-(2',6'-oxido-10'-hydroxytridec-1'-enyl)-4,5-benzobenzoic acid-10'-lactone is prepared from methyl 2 - (6',6';10',10' - bisethylenedioxytridec - 1'-enyl)-4,5-benzobenzoic acid ester via the process of Scheme C.

A representative group of the novel compounds of Formulas IV–VIII, VIA, XI and XII, by reference to the product compounds of this invention as illustrated by Formula I above, are represented by the following structural formula:

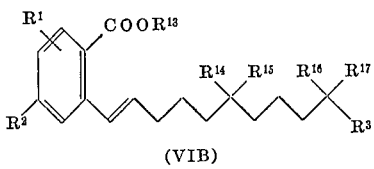

(VIB)

wherein each of $R^1$, $R^2$ and $R^3$ are as defined above;

$R^{13'}$ is hydrogen or (lower)alkyl; one of $R^{14}$ and $R^{15}$ is hydrogen and the other is hydroxy; or $R^{14}$ and $R^{15}$ taken together are =O or ethylenedioxy; and one of $R^{16}$ and $R^{17}$ is hydrogen and the other is hydroxy; or $R^{16}$ and $R^{17}$ taken together are =O or ethylenedioxy; provided, when one of $R^{14}$ and $R^{15}$ is hydroxy, one of $R^{16}$ and $R^{17}$ is hydroxy; or when $R^{14}$ and $R^{15}$ taken together are =O, one of $R^{16}$ or $R^{17}$ is hydroxy or $R^{16}$ and $R^{17}$ taken together are =O.

The novel compounds of the following formula:

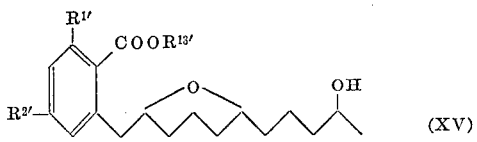

wherein $R^{1'}$, and $R^{2'}$ and $R^{13}$ are as defined above, are prepared from the corresponding dihydroxy compounds of Formula XII above, by distilling from a mixture comprising the latter dihydroxy compound, an alkali metal hydride and benzene, the benzene over a period of $\frac{1}{2}$ hour to 3 hours. One-tenth to one-half of the benzene is distilled off.

By treating the compound of Formula XV, the 2-(2',6'-oxido-10'-hydroxyundecyl) benzoic acid lactone, to the process of Scheme C the novel compound of Formula XIII is obtained.

The novel compounds represented by Formula VIA, VIB, XI, XII and XV in addition to their usefulness as intermediates as indicated and described in detail above, also exhibit estrogenic activity and anabolic activity, as do the compounds of Formula I, IX, X, XIII and XIV, and can be isolated from the reaction process and thus used.

The 2-formyl benzoic acid ester, the compound of Formula IId, is prepared from the corresponding 2-methyl benzoic acid ester via the novel process illustrated by the following reaction Scheme D.

Scheme D

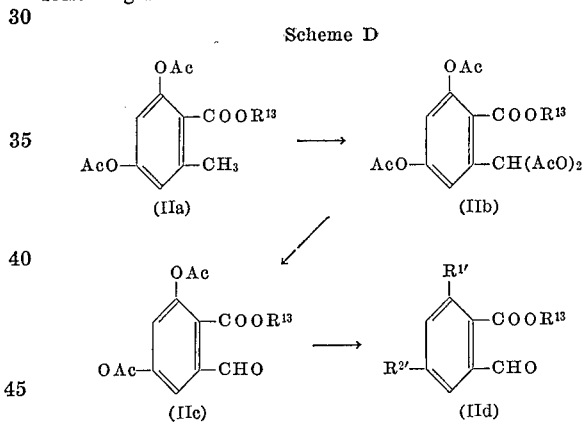

wherein each of $R^{1'}$, $R^{2'}$ and $R^{13}$ are as defined above; Ac is acetyl; and AcO is acetoxy.

In the above scheme, conventional acetylation of a 2-methyl benzoic acid ester, such as the ethyl ester of 4,6-dihydroxy-o-toluic acid, provides the starting compound IIa. Treatment thereof with chromium trioxide in acetic acid and acetic anhydride in the presence of sulfuric acid affords the corresponding 2-(1',1'-bisacetoxymethyl) benzoic acid ester, the compound of Formula IIb. Hydrolysis with aqueous acid provides the 2-formyl benzoic acid ester derivative IIc, which is thereafter subjected to base hydrolysis as with aqueous base such as aqueous sodium bicarbonate to afford the 4,6-dihydroxyl groups and subsequent etherification therof (such as with sodium hydride and alkyl halide, cyclopentyl halide or benzyl halide in which the halide is selected from the group consisting of chloride, bromide or iodide or dihydrofuran or dihydropyran in the presence of an acid catalyst) gives the corresponding 2-formyl-4,6-bisether benzoic acid ester, a compound of Formula IId.

By employing a 2-methyl-4,5-benzobenzoic acid ester (an ester of 3-methyl-β-naphthoic acid) as the 2-methyl benzoic acid ester in Scheme D, 2-formyl-4,5-benzobenzoic acid ester is obtained via the Scheme D process.

The 5,5;9,9 - bisethylenedioxy - 1 - decyltriphenylphosphonium halide, the compound of Formula IIIk, of reaction Scheme A can be prepared via the process outlined in the following reaction Scheme E.

Scheme E

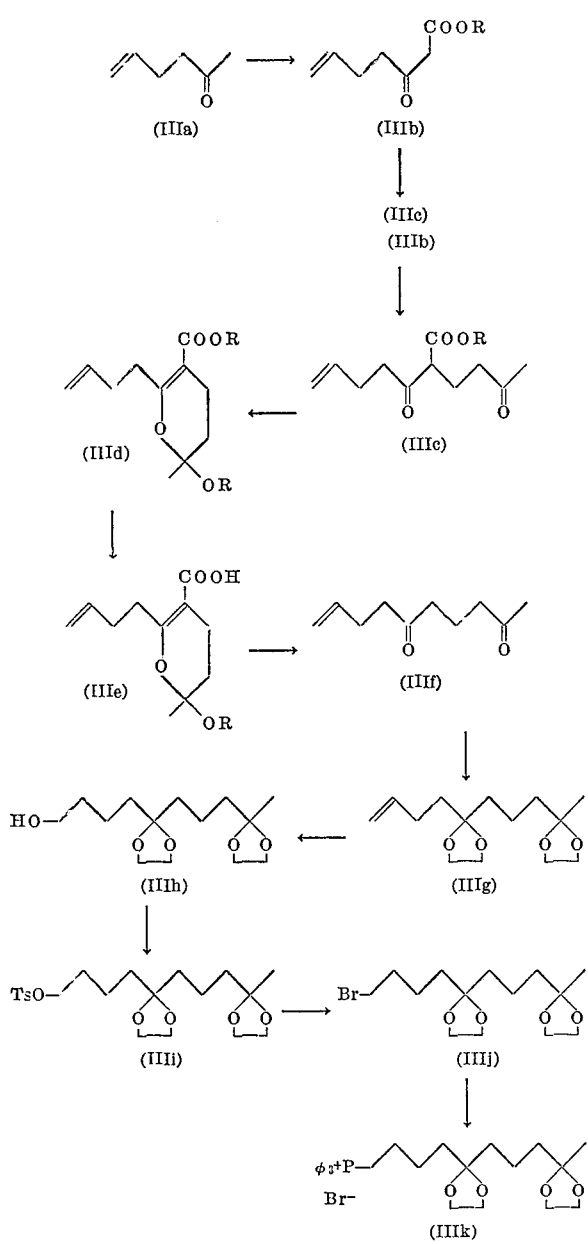

in which X and φ are as defined above; and TsO is tosylate.

In the above scheme, the compound of Formula IIIa, 5 - oxohex - 1 - ene, is refluxed with a dialkyl carbonate and an alkali metal hydride in an inert organic solvent, such as ether, to furnish the corresponding compound of Formula IIIb, 3 - oxohept - 6 - enoate ester. The compound of Formula IIIc, a 2 - (3' - oxoalkyl) - 3 - oxohept - 6-enoate, is prepared by treating the corresponding compound of Formula IIIb with methyl vinyl ketone and an alkali metal alkonate in an absolute alkanol, such as ethanol, at between —20° C. and 0° C. The compound of Formula IIIc is then treated with a trialkyl orthoformate, such as triethylorthoformate, in the presence of an acid catalyst, such as p-toluenesulfonic acid, in an inert organic solvent, such as dioxane, to obtain the corresponding compound of Formula IIId, a 2-(but-3'-enyl)-3-carboalkoxy - 6 - alkoxy - 6 - methyl dihydropyran. Hydrolyzing the latter with aqueous base, such as aqueous sodium hydroxide, affords the corresponding compound of Formula IIIe, a 2 - (but - 3' - enyl) - 3 - carboxy - 6 - alkoxy - 6-methyl dihydropyran. The compound of Formula IIIf, a 5,9 - dioxodec - 1 - ene, is prepared by hydrolyzing the compounds of Formula IIIe with an aqueous acidic mixture. The compound of Formula IIIf is etherified with ethylene glycol in the presence of an acid catalyst to afford the corresponding compound of Formula IIIg, a 5,5;9,9-bisethylenedioxydec-1-ene. The latter compound is treated with sodium borohydride and borontrifluoride etherate; then the resulting mixture is oxidized with hydrogen peroxide in the presence of aqueous base to afford the corresponding compound of Formula IIIh, a 5,5;9,9-bisethylenedioxydecan-1-ol. The latter is tosylated by treating with p-toluenesulfonyl chloride in pyridine to yield the corresponding compound of Formula IIIi, which upon treatment with an alkali metal bromide, such as lithium bromide, in an inert organic solvent yields the corresponding compound of Formula IIIj, a 5,5;9,9-bisethylenedioxydecyl bromide. The latter is refluxed with triphenylphosphine in an inert organic solvent, such as benzene, to furnish the corresponding compound of Formula IIIk, a 5,5;9,9-bisethylenedioxy-1-decyltriphenyl phosphonium bromide.

By employing other alkyl vinyl ketones in place of methyl vinyl ketone in the above process, other 5,5;9,9-bisethylenedioxy - 1 - alkyltriphenyl phosphonium bromides are obtained. For example, by employing ethyl vinyl ketone, 5,5;9,9 - bisethylenedioxy - 1 - undecyl triphenyl phosphonium bromide is obtained. Other phosphonium halides, besides the phosphonium bromides of Formula IIIk, can be used in the process of Scheme A. For example, phosphonium chlorides or iodides can be used. These other phosphonium halides are prepared via the novel process of Scheme E by employing alkali metal chlorides or iodides in place of alkali metal bromides.

The $R^5$ substituents are provided by reducing the keto function at position C–6' of the molecule to give the corresponding alcohol or treating it with an alkyl-, alkenyl-, or alkynyllithium or, alternatively, an alkyl-, alkenyl-, or alkynylmagnesium halide to provide the corresponding 6'-aliphatic-6'-hydroxy derivatives. The resultant hydroxy group in each instance can be etherified and esterified via conventional techniques giving the corresponding ethers and esters thereof. The 6'-keto can be removed such as by converting it to the corresponding 6',6'-thioketal and cleaving this with Raney nickel, thus giving the 6'-unsubstituted compound. Reduction of the 6'-keto, such as with sodium borohydride gives the corresponding 6'-alcohol which may be etherified or esterified as described above or, alternatively, treated with p-toluenesulfonyl chloride in pyridine solution followed by removal of the p-tosylate group upon refluxing with collidine to give a mixture of 5'- and 6'-unsaturated derivatives which can be separated such as by selective crystallization from ethanol. Treatment of the 6'-keto with sulfur tetrafluoride in dioxane gives the corresponding 6',6'-difluorocompounds.

Further, the above mentioned keto group can be converted to the corresponding oxime, such as by treatment with hydroxylamine hydrochloride; a hydrazone, such as with hydrazine itself or a substituted hydrazine, for example, methylhydrazine, phenylhydrazine, 2,4-dinitrophenylhydrazine, semicarbazine, and the like; an acetal with ethylene glycol, trimethylene glycol, and the like; imines, such as are provided by reaction with methylamine, dimethylamine, ethylamine, aniline, benzylamine, and the like; amines by reduction of the corresponding imine; as well as various other groups known to one skilled in the art. It can also undergo a Beckmann rearrangement to give the corresponding lactam.

In addition, certain other modifications can be made to the thus prepared compound, such as selective hydrogenation of one or more unsaturated linkages, either in the benzoic acid ring or at position 1', 2', (wherein $R^6=R^7=$ H), such as by utilizing a poisoned hydrogenation catalyst.

Illustrative 1,2-benzoic acid lactones of the above skeletal Formula which are thus prepared by following one or more of the above outlined procedures using the requisite starting compounds or treatment of the product compound of Formulas IX and X hereof are as follows:

2-(10'-hydroxyundec-1'-enyl)-4,6-dihydroxybenzoic acid-10'-lactone,
2-(6',10'-dihydroxyundec-1'-enyl)-4,6-dihydroxybenzoic acid-10'-lactone,
2-(10'-hydroxyundec-1',5'-dienyl)-4,6-dihydroxybenzoic acid-10'-lactone,
2-(10'-hydroxyundec-1',6'-dienyl)-4,6-dihydroxybenzoic acid-10'-lactone,
2-(6'-keto-10'-hydroxyundecanyl)-4,6-dihydroxybenzoic acid-10'-lactone,
2-(6'-keto-10'-hydroxyundec-1'-enyl)-4,6-dimethoxybenzoic acid-10'-lactone,
2-(6'-keto-10'-hydroxyundec-1'-enyl)-4,6-diacetoxybenzoic acid-10'-lactone,
2-(6'-keto-10'-hydroxyundec-1'-enyl)-4,6-biscyclopentyloxybenzoic acid-10'-lactone,
2-(6'-keto-10'-hydroxyundec-1'-enyl)-4,6-bistetrahydropyran-2'-yloxybenzoic acid-10'-lactone,
2-(6'-keto-10'-hydroxyundec-1'-enyl)-4,6-bistetrahydrofuran-2'-yloxybenzoic acid-10'-lactone,
2-(6'-keto-10'-hydroxyundec-1'-enyl)-4,5-benzobenzoic acid-10'-lactone,
2-(6-ethynyl-6',10'-dihydroxyundec-1'-enyl)-4,6-dihydroxybenzoic acid-10'-lactone,
2-(6'-methyl-6',10'-dihydroxyundec-1'-enyl)-4,6-dihydroxybenzoic acid-10'-lactone,
2-(6'-ethynyl-6'-tetrahydropyran-2'''-yloxy-10''-hydroxyundec-1'-enyl)-4,6-bistetrahydropyran-2'-yloxybenzoic acid-10'-lactone,
2-(6'-acetoxy-6'-ethynyl-10'-hydroxyundec-1'-enyl)-4,6-diacetoxybenzoic acid-10'-lactone,
2-(6'-acetoxy-10'-hydroxyundec-1'-enyl)-4,6-dihydroxybenzoic acid-10'-lactone,
2-(6'-tetrahydropyran-2'''-yloxy-10'-hydroxyundec-1'-enyl)-4,6-bistetrahydropyran-2'-yloxybenzoic acid-10'-lactone,
2-(6',6'-difluoro-10'-hydroxyundec-1'-enyl)-4,6-dihydroxybenzoic acid-10'-lactone,
2-(6',6'-ethylenedioxy-10'-hydroxyundec-1'-enyl)-4,6-dihydroxybenzoic acid-10'-lactone,
2-(6'-oxo-10'-hydroxydodec-1'-enyl)-4,6-dihydroxybenzoic acid-10'-lactone, and
2-(6',6'-ethylenedioxy-10'-hydroxy-11'-methyldodec-1'-enyl)-benzoic acid-10'-lactone.

It will be understood that various substituent combinations not included in the above partial list but covered by the scope hereof are similarly prepared in accordance with the above discussion and hereinafter contained examples.

The following examples illustrate the manner by which this invention can be practiced, but it will be understood that they are not to be construed as limitations upon the overall scope hereof.

EXAMPLE 1

A mixture of 1 g. of ethyl 2-methyl-4,6-dihydroxybenzoate, 1 g. of p-toluenesulfonic acid monohydrate, 7 ml. of pyridine and 5 ml. of acetic anhydride is allowed to stand at room temperature for 24 hours, and then is poured into water and stirred. This mixture is then extracted with methylene chloride, and these extracts are dried and evaporated to yield ethyl 2-methyl-4,6-diacetoxybenzoate which is recrystallized from acetone:ether.

To a suspension of 1 g. of chromium trioxide in 30 ml. of an acetic acid-acetic anhydride-sulfuric acid mixture (1:1:1/30 by weight) is added 1 g. of ethyl 2-methyl-4,6-diacetoxybenzoate. After standing for 3 hours at 0° C., the mixture is poured into an excess sodium bisulfite solution and the product is extracted by ether. The combined ether extracts are then washed with water, dried over sodium sulfate, evaporated and crystallized from ethanol to yield ethyl 2-diacetoxymethyl-4,6-diacetoxybenzoate.

A solution of 1 g. of ethyl 2-diacetoxymethyl-4,6-diacetoxybenzoate in 1 mg. of 1N hydrochloric acid and 100 ml. of aqueous methanol (90% by weight) is allowed to stand at 20° C. for 30 minutes. Thereafter, the unreacted acid is destroyed with excess sodium bicarbonate. The aqueous phase is extracted with ether and the extracts are evaporated to give ethyl 4,6-diacetoxybenzoate-2-al.

A solution of 1 g. of ethyl 4,6-diacetoxybenzoate-2-al in 50 ml. of methanol is heated at reflux for 3 hours with a solution of ½ g. of sodium bicarbonate in 10 ml. of water. The reaction mixture is then poured into ice water, and the solid which forms is collected by filtration, washed with water to neutrality and dried to yield ethyl 4,6-dihydroxybenzoate-2-al which is recrystallized from methylene chloride:ether.

Twenty milliliters of methyl iodide are added to a mixture of 1 g. of ethyl 4,6-dihydroxybenzoate-2-al, 15 g. of potassium carbonate and 100 ml. of acetone. This mixture is refluxed for 4 hours, and then is filtered and evaporated. The residue is dissolved in diethyl ether, washed with water, dried and evaporated. The residue is crystallized from acetone-hexane, to yield ethyl 4,6-bismethoxybenzoate-2-al.

Similarly, ethyl 4,6-bisethoxybenzoate-2-al, ethyl 4,6-biscyclopentoxybenzoate-2-al, and ethyl 4,6-bisbenzyloxybenzoate-2-al are prepared via the above process by employing ethyl iodide, cyclopentyl iodide, and benzyl bromide, respectively, in place of methyl iodide in the above process.

Ethyl 2-formylbenzoate and ethyl 2-formyl-4,5-benzobenzoate are prepared from ethyl 2-methylbenzoate and ethyl 3-methyl-β-naphthoate, respectively, via the above process.

EXAMPLE 2

Step A

A solution of 81 g. of 5-oxohex-1-ene in 100 ml. of ether is added during 2 hours to a boiling mixture of 179 g. of diethyl carbonate and 37 g. of sodium hydride (50% dispersion in oil) in 300 ml. of ether. After heating under reflux for a further 2 hours, ethanol is added to destroy the excess hydride, and the resulting mixture is then poured onto ice and acidified with acetic acid. Extraction with ether and distillation gives ethyl-3-oxohept-6-enoate.

Step B

A solution of 88 g. of the above ester in 1 liter of absolute ethanol is cooled to −10° C., and sodium ethoxide (from 0.5 g. sodium) is added. To this solution is added 37 g. of methyl vinyl ketone over a 1 hour period; the resulting mixture is kept at −10° C. for a further 2 hours. Excess acetic acid is then added to neutralize the base, and the resulting mixture is evaporated in vacuo. The residue is extracted with ether, washed with sodium bicarbonate solution and with water, evaporated and distilled to give ethyl 2-(3'-oxobutyl)-3-oxohept-6-enoate.

STEP C

A solution of 13 g. of the above diketo ethyl ester product in 120 ml. of dioxane and 13 ml. of triethyl orthoformate containing 3 g. of p-toluenesulfonic acid is kept at 20° C. for 3 hours. After pyridine is added to neutralize the acid, the solution is diluted with water and extracted with ether. The combined ether extracts are dried over magnesium sulfate and then evaporated in vacuo. Chromatography on silica gel gives 2-(but-3'-enyl)-3-carboethoxy-6-ethoxy-6-methyl dihydropyran.

Step D

A solution of 8.3 g. of the above 3-carboethoxy dihydropyran product in 13 ml. of water and 9 ml. of ethanol containing 9 g. of patassium hydroxide is heated under reflux for 48 hours. The cooled solution is extracted with ether to remove neutral substances and then acidified with dilute hydrochloric acid. Extraction with ether gives, after drying over magnesium sulfate, evaporating and crystallizing from hexane, 2-(but-3'-en-1'-yl)-3-carboxy-6-ethoxy-6-methyl dihydropyran.

Step E

A solution of 8.1 g. of the above 3-carboxy-dihydropyran product in 45 ml. of dioxan and 15 ml. of water containing 1.3 g. of p-toluenesulfonic acid is allowed to stand at 20° C. for 15 hours. Ether is then added, and the resulting mixture is washed with aqueous sodium bicarbonate and with water, dried over magnesium sulfate, and evaporated in vacuo. Chromatography on silica gel gives dec-1-ene-5,9-dione.

Step F

A solution of 55 g. of the above diketo product in 500 ml. of benzene and 81 g. of ethylene glycol containing 6 g. of p-toluenesulfonic acid is heated under reflux for 6 hours with separation of the water formed (Dean-Stark separator). Pyridine is added to the cooled solution which is then washed with water and dried over magnesium sulfate. Evaporation of the solvent and distillation of the residue gives 5,5;9,9-bisethylenedioxydec-1-ene.

Step G

A solution of 33 g. of the above bisketal product in 100 ml. of diglyme is treated with 3.5 g. of sodium borohydride followed by 25 ml. of boron trifluoride etherate in 20 ml. of diglyme. The mixture is cooled and 30 ml. of 3 N sodium hydroxide and 30 ml. of 30% hydrogen peroxide are simultaneously added with care. The resulting mixture is diluted with water and extracted with ether. The combined ether extracts are dried over magnesium sulfate and evaporated in vacuo to give 5,5;9,9-bisethylenedioxydecan-1-ol.

Step H

A solutuion of 2 g. of the above alcohol product in 5 ml. of pyridine is treated with 3 g. of p-toluene- sulfonyl chloride. The mixture is allowed to stand at 20° C. for 2 hours, then is cooled in ice-water and 1 ml. of water is added. After standing for 1 hour at 20° C., to allow hydrolysis of the unreacted reagent, hexane is added; the mixture is then filtered, and the resulting filtrate is washed 10 times with water. Evaporation of the solvent gives the tosylate ester of 5,5;9,9-bisethylenedioxydecan-1-ol.

Step I

The above tosylate ester is dissolved in 30 ml. of acetone containing 10 g. of lithium bromide; the resulting mixture is stirred for 6 hours. The solvent is removed from the mixture in vacuo, and the resulting residue is treated with water and extracted with ether. The combined extracts are dried over magnesium sulfate and evaporated in vacuo. Chromatography on silica gel gives 1-bromo-5,5;9,9-bisethylenedioxydecane.

Step J

A solution of 1.7 g. of the above bromide product and 2 g. of triphenylphosphine in 7 ml. of benzene is heated under reflux for 48 hours. The solvent was evaporated in vacuo and the residue washed 5 times with ether. Removal of ether in vacuo gives 5,5;9,9-bisethylenedioxy-1-decyl phosphonium bromide.

By utilizing ethyl vinyl ketone and isopropyl vinyl ketone in place of methyl vinyl ketone in Step B of the above process, 5,5;9,9-bisethylenedioxy - 1 - undecyl-triphenyl phosphonium bromide and 5,5;9,9-bisethylenedioxy-10-methyl-undecyl - triphenyl phosphonium bromide are respectively obtained via the above process.

EXAMPLE 3

Step A

A solution of 0.30 g. of ethyl 4,6-dimethoxybenzoate-2-al and 1.1 g. of 5,5;9,9-bisethylenedioxy-1-decyl phosphonium bromide in 11 ml. of dimethylsulfoxide is dried over molecular sieves and then transferred to another flask. A solution of 0.30 g. of potassium t-butoxide in 1 ml. of dimethylsulfoxide is then added under nitrogen. After heating at 47° C. for 5 hours, the reaction mixture is poured into water and extracted with ether. Evaporation of the solvent and chromatography on silica gel gives ethyl 2 - (6',6';10',10'-bisethylenedioxyundec-1'-enyl)-4,6-dimethoxybenzoate.

Step B

A solution of 130 mg. of ethyl 2-(6'6';10',10'-bisethylenedioxyundec-1'-enyl)-4,6-dimethoxybenzoate and 5 g. of potassium hydroxide in 50 ml. of dimethylsulfoxide is heated at 75° C. under nitrogen for 4 hours. The solution is acidified with dilute hydrochloric acid, diluted with water, and extracted with dichloromethane. Evaporation of the solvent gives 2-(6',6';10',10'-bisethylenedioxyundec-1'-enyl)-4,6-dimethoxybenzoic acid. The above benzoic acid product is further treated with 10 ml. of acetone containing 1 ml. of water and 10 mg. of p-toluenesulfonic acid for 8 hours. Addition of water, extraction with benzene and evaporation of the solvent gives 2-(6',6'-ethylenedioxy - 10'-oxoundec-1'-enyl)-4,6-dimethoxybenzoic acid. Addition of a slight molar excess (based upon the amount of benzoic acid product) of diazomethane in ether to 2-(6',6'-ethylenedioxy-10'-oxoundec-1'-enyl)-4,6-dimethoxybenzoic acid gives methyl 2-(6',6'-ethylenedioxy-10'-oxoundec-1'-enyl)-4,6-dimethoxybenzoate. The above resulting methyl benzoate product is further treated with 200 mg. of sodium borohydride in 10 ml. of ethanol for 10 minutes, followed by the addition of 2 ml. of acetone. The solution is evaporated to dryness and the residue is extracted with benzene. Concentration of the combined extracts gives methyl 2-(6',6'-ethylenedioxy-10'-hydroxyundec-1'-enyl)-4,6-dimethoxybenzoate.

Step C

To 5 ml. of t-amyl alcohol is added 30 mg. of sodium and the mixture is heated until dissolution is complete. A solution of 10 mg. of methyl 2-(6',6'-ethylenedioxy-10'-hydroxyundec-1'-enyl)-4,6-dimethoxybenzoate in 100 ml. of dry toluene is added and the solution is distilled through a Dufton column during a period of 6 hours, a total of 20 ml. of distillate being collected. Excess acetic acid is added and the solvents are removed in vacuo. Extraction of the residue with dichloromethane and evaporation of the solvent gives 2-(6',6'-ethylenedioxy - 10' - hydroxyundec-1'-enyl)-4,6-dimethoxybenzoic acid-10'-lactone.

Step D

This benzoic acid lactone product is treated with 5 mg. of p-toluenesulfonic acid in 0.5 ml. of acetone followed by addition of excess triethylamine and then evaporated to dryness. Extraction of the residue with dichloromethane and preparative thin layer chromatography of the product on silica gel gives 2-(6'-oxo-10'-hydroxyundec-1'-enyl)-4,6-dimethoxybenzoic acid-10'-lactone.

Ethyl 2-(6',6';10',10'-bisethylenedioxydodec-1'-enyl)-4,6-dicyclopentoxybenzoate; methyl 2-(6',6';10',10'-bisethylenedioxyundec-1'-enyl)-4,5-benzobenzoate; ethyl-(6',6';10',10' - bisethylenedioxy-11'-methyldodec-1'-enyl)-benzoate; and ethyl 2-(6',6';10',10'-bisethylenedioxyundec-1'-enyl)-4,6-bistetrahydrofuran-2'-yloxybenzoate are prepared from ethyl 2-formyl-4,6-biscyclopentoxybenzoate and 5,5;9,9-bisethylendioxy-1-undecyl phosphonium bromide; methyl 2-formyl-4,5-benzobenzoate and 5,5;9,9-bisethylenedioxy-1-decyl phosphonium iodide; ethyl 2-formylbenzoate and 5,5;9,9-bisethylenedioxy-10-methyl-1-undecyl phosphonium chloride; and ethyl 2-formyl-4,6-bistetrahydrofuran-2'-yloxybenzoate and 5,5;9,9-bisethylenedioxy-1-decyl phosphonium bromide, respectively, via Step A of the above process.

Similarly, 2-(6',6'-ethylenedioxy-10'-hydroxyundec-1'-enyl)-4,6-dihydroxybenzoic acid and methyl 2-(6',6'- ethylenedioxy - 10'-hydroxyundec-1'-enyl)-4,6-dihydroxybenzoate; 2 - ,(6',6'-ethylenedioxy-10'-hydroxyundec-1'-enyl)-4,6-bisbenzyloxybenzoic acid and methyl 2-(6',6'-ethylenedioxy - 10'-hydroxyundec-1'-enyl)-4,6-bisbenzyloxybenzoate; 2-(6',6'-ethylenedioxy-10'-hydroxyundec-1'-enyl) - 4,6-bistetrahydropyran-2'-yloxybenzoic acid and methyl 2-(6',6'-ethylenedioxy-10'-hydroxyundec-1'-enyl)-4,6-bistetrahydropyran-2'-yloxybenzoate; and 2-(6',6'-ethylenedioxy - 10'-hydroxyundec-1'-enyl)-5,6-benzobenzoic acid and methyl 2-(6',6'-ethylenedioxy-10'-hydroxyundec-1'-enyl)-5,6-benzobenzoate are prepared from ethyl 2-(6',6';10',10' - bisethylenedioxyundec-1'-enyl)-4,6-dihydroxybenzoate; ethyl 2-(6',6';10',10'-bisethylenedioxyundec-1'-enyl)-4,6-bisbenzyloxybenzoate; ethyl 2-(6',6';10',10'-bisethylenedioxyundec - 1' - enyl) - bistetrahydropyran-2'-yloxybenzoate; and ethyl 2-(6',6';10',10'-bisethylendioxyundec-1'-enyl)-5,6-benzobenzoate, respectively, via Step B of the above process.

Similarly, a 2-(6'-oxo-10'-hydroxyundec-1'-enyl)-4,6-bistetrahydropyran-2'-yloxybenzoic acid-10'-lactone and 2 - (6'-oxo-10'-hydroxydodec-1'-enyl)-4,5-benzobenzoic acid-10'-lactone are prepared from methyl 2-(6',6'-ethylenedioxy - 10' - hydroxyundec-1'-enyl)-4,6-bistetrahydropyran-2'-yloxybenzoate and methyl 2-(6',6'-ethylenedioxy-10'-hydroxydodec-1'-enyl)-4,6-benzobenzoate, respectively, via Step C of the above process.

EXAMPLE 4

One gram of sodium borohydride is added to an ice-cooled solution of 1 g. of 2-(6',6'-ethylenedioxy-10'-oxo-undec-1'-enyl)-4,6-dimethoxybenzoic acid in 120 ml. of methanol, and the mixture is then allowed to stand for 16 hours at room temperature. The excess reagent is decomposed by addition of acetone, and the solution is then concentrated to small volume in vacuo and diluted with water. The product is extracted with ethyl acetate and these extracts are washed with water, dried and evaporated to yield 2-(6',6'-ethylenedioxy-10'-hydroxyundec-1'-enyl)-4,6-dimethoxybenzoic acid which may be further purified by recrystallization from acetone: hexane.

Similarly, 2-(6',6'-ethylenedioxy-10'-hydroxyundec-1'-enyl) - 4,6-bisbenzyloxybenzoic acid; 2-(6',6'-ethylenedioxy-10' - hydroxyundec-1'-enyl)-4,6-bistetrahydrofuran-2'-yloxybenzoic acid; and 2-(6',6'-ethylenedioxy-10'-hydroxy - 11' - methyldodec-1'-enyl)-4,6-biscyclopentoxybenzoic acid are prepared from the corresponding 10'-oxo compounds.

EXAMPLE 5

To a solution of 1.1 equivalents of dicyclohexylcarbodiimide in pyridine is added 1 g. of 2-(6',6'-ethylenedioxy - 10' - hydroxyundec - 1' - enyl) - 4,6 - dimethoxybenzoic acid. The mixture is allowed to stand at room temperature for 24 hours, after which time it is diluted with water and extracted with ether. The excess pyridine is removed from the ether extracts by thorough washing with water and the extracts are thereafter evaporated to dryness, giving 2-(6',6' - ethylenedioxy - 10' - hydroxyundec-1'-enyl)-4,6-dimethoxybenzoic acid-10'-lactone.

EXAMPLE 6

A mixture of 1 g. of 2-(6',6'-ethylenedioxy-10'-hydroxyundec-1'-enyl)-4,6-dimethoxybenzoic acid, 2 g. of acetic anhydride and 100 ml. of diethyl ether are stirred for 8 hours. The reaction mixture is then diluted with 100 ml. of aqueous 50% methanol and extracted with methylene chloride. The combined extracts are washed with water, dried over sodium sulfate and evaporated to give 2-(6',6' - ethylenedioxy - 10' - hydroxyundec - 1' - enyl)-4,6-dimethoxybenzoic acid-10'-lactone.

EXAMPLE 7

A mixture of 4.0 g. of 2-(6',6'-ethylenedioxy-10'-hydroxyundec - 1' - enyl)-4,6-dimethoxybenzoic acid and 4.0 g. of p-toluenesulfonyl chloride in 100 ml. of pyridine are allowed to stand at room temperature for 8 hours. The mixture is diluted with 500 ml. of water after 2 hours. The resulting mixture is extracted with methylene chloride to give, after the combined extracts are washed with water, dried over sodium sulfate, filtered and evaporated, 2-(6',6' - ethylenedioxy - 10' - hydroxyundec - 1'-enyl)-4,6-dimethoxybenzoic acid-10'-lactone.

The same result is achieved by employing trifluoroacetic anhydride, chloroacetic anhydride and trichloroacetic anhydride in place of acetic anhydride.

EXAMPLE 8

A solution of 4 mg. of 2-(6'-oxo-10'-hydroxyundec-1'-enyl)-2,4-dimethoxybenzoic acid-10'-lactone and 1 ml. of dry methylene dichloride is treated with 0.1 ml. of boron tribromide. After 1 hour at 20° C., the mixture is added to a sodium bicarbonate solution at 0° C., and the product is extracted with ether. Thin layer chromatography and sublimation give DL-zearalenone [2-(6'-oxo-10'-hydroxyundec - 1' - enyl)-4,6-dihydroxybenzoic acid-10'-lactone].

EXAMPLE 9

A mixture of 0.5 g. of 2-(6',6'-ethylenedioxy-10'-hydroxyundec - 1' - enyl)-4,6-dimethoxybenzoic acid-10'-lactone in 125 ml. of methylene chloride and 12.5 ml. of boron tribromide is allowed to stand at room temperature for 2 hours. It is then poured into ice-water containing 5% by weight of sodium bicarbonate. The resulting mixture is extracted with diethyl ether, and the combined extracts are washed with water to neutrality, dried over sodium sulfate and evaporated to dryness. The residue is triturated with ether to yield DL-zearalenone [2-(6'-oxo-10'-hydroxyundec - 1' - enyl)-4,6-dihydroxybenzoic acid-10'-lactone] which is recrystallized from acetone:hexane.

EXAMPLE 10

To a suspension of 1 g. of 2-(6'-oxo-10'-hydroxyundec-1'-enyl)-4,6-dihydroxybenzoic acid-10'-lactone in 25 ml. of acetone is added a solution of 0.5 g. of potassium hydroxide in 37.5 ml. of water, and the stirred mixture is heated dropwise with 10 ml. of methyl sulfate. The mixture is stirred for an additional 45 minutes and then is poured into dilute hydrochloric acid. The solid which forms is collected by filtration and dried to yield 2-(6'-oxo-10'-hydroxyundec - 1' - enyl)-4,6-dimethoxybenzoic acid-10'-lactone which is recrystallized from chloroform: methanol.

The following procedures illustrate methods by which various ester and ether groups can be inserted on the benzoic acid ring.

A mixture of 1 g. of 2-(6'-oxo-10'-hydroxyundec-1'-enyl)-4,6-dihydroxybenzoic acid-10'-lactone, 1 g. of p-toluenesulfonic acid monohydrate, 75 ml. of acetic acid and 50 ml. of acetic anhydride is allowed to stand at room temperature for 24 hours, and then is poured into water and stirred. This mixture is then extracted with methylene chloride and these extracts are dried and evaporated to yield 2-(6'-oxo-10'-hydroxyundec-1'-enyl)-4,6-diacetoxybenzoic acid-10'-lactone which is recrystallized from acetone:ether.

Similarly, the corresponding 4,6-propionyloxy derivative is prepared upon substitution of propionic anhydride for acetic anhydride in the above procedure.

A mixture of 1 g. of 2-(6'-oxo-10'-hydroxyundec-1'-enyl)-4,6-dihydroxybenzoic acid-10'-lactone in 8 ml. of pyridine and 5 ml. of adamantoyl chloride is heated at steam bath temperatures for 1 hour. The mixture is then poured into ice-water and the solid which forms is collected by filtration, washed with water and dried to yield 2-(6'-oxo-10'-hydroxyundec - 1' - enyl)-4,6-bisadamantoyloxybenzoic acid-10'-lactone which is further purified through recrystallization from methylene chloride:hexane.

Five milliliters of dihydropyran are added to a solution of 1 g. of 2-(6'-oxo-10'-hydroxyundec-1'-enyl)-4,6-dihydroxybenzoic acid-10'-lactone in 15 ml. of benzene. About 1 ml. is removed by distillation to eliminate moisture and 0.04 g. of p-toluenesulfonyl chloride is added to the cooled solution. This mixture is allowed to stand at room temperature for 1 day, and is then washed with aqueous sodium carbonate solution and water, dried and evaporated. The residue is chromatographed on neutral alumina, eluting with hexane, to yield 2-(6'-oxo-10'-hydroxyundec-1'-enyl)-4,6 - bistetrahydropyran - 2' - yloxybenzoic acid-10'-lactone which is recrystallized from pentane.

To a solution of 1 g. of 2-(6'-oxo-10'-hydroxyundec-1'-enyl)-4,6-dihydroxybenzoic acid-10'-lactone in 20 ml. of benzene, 20 ml. of dihydrofuran is added. Five milliliters is distilled off to remove moisture, and the mixture is allowed to cool to room temperature. To the cooled mixture 0.02 g. of freshly purified p-toluenesulfonyl chloride is added. The mixture is stirred at room temperature for 24 hours and then is poured into an excess of 5% aqueous sodium bicarbonate solution. The product is extracted with ethyl acetate, the organic solution is washed with water until neutral, dried over anhydrous magnesium sulfate, and evaporated to dryness under reduced pressure. The oily residue crystallizes on the addition of ether to yield the 2-(6'-oxo-10'-hydroxyundec-1'-enyl)-4,6-bistetrahydrofuran-2'-yloxybenzoic acid-10'-lactone.

A solution of 5 g. (0.016 mole) of 2-(6'-oxo-10'-hydroxyundec-1'-enyl)4,6-dihydroxybenzoic acid-10'-lactone in 50 ml. of benzene is heated to reflux and about 2 ml. is removed by distillation to eliminate moisture. The mixture is cooled to room temperature and then two chemical equivalents of sodium hydride are added followed by the dropwise addition of two chemical equivalents of cyclopentyl bromide in 20 ml. of benzene over a period of 20 minutes. The mixture is allwed to reflux for 20 hours, after which time the precipitate of sodium bromide is removed by filtration and the organic phase is dried and evaporated to yield 2-(6'-oxo-10'-hydroxyundec-1'-enyl)-4,6-biscyclopentyloxybenzoic acid-10'-lactone which is recrystallized from acetone:hexane.

Similarly, 2-(6'-oxo-10'-hydroxydodec-1'-enyl)-4,6-dihydroxybenzoic acid-10'-lactone; 2-(6'-oxo-10'-hydroxy-11'-methyldodec-1'-enyl)-4,6-dihydroxybenzoic acid-10'-lactone; and 2-(6'-oxo-10'-hydroxytridec-1'-enyl)-4,6-dihydroxybenzoic acid-10'-lactone can be etherified or esterified at positions C–4 and C–6.

EXAMPLE 11

To a solution of 1 g. of triphenylphosphine in 30 ml. of benzene is added 1 g. of 1-bromo-5,5;9,9-bisethylenedioxydecane, and the mixture is refluxed for 1 hour. The reaction mixture is thereafter filtered and the insoluble material is recovered and added to 50 ml. of tetrahydrofuran. Two equivalents of butyllithium are added and the mixture is stirred until a solution forms, which contains 5,5;9,9-bisethylenedioxy-1-decylidene triphenyl phosphorane.

EXAMPLE 12

To the solution prepared via the procedure outlined in Example 11 above is added 1 g. of ethyl 2-formyl-4,6-methoxybenzoate, and the resultant mixture is refluxed for 12 hours. Thereafter, 50 ml. of water are added to the reaction mixture, and it is then extracted with successive portions of ether, and the ether extracts are chromatographed on silica gel, thus giving ethyl 2-(6',6'; 10',10'-bisethylenedioxyundec-1'-enyl) - 4,6 - dimethoxybenzoate.

EXAMPLE 13

A mixture of 0.5 g. of ethyl 2-(6',10'-bisethylenedioxy-undec-1'-enyl)-4,6-dimethoxybenzoate in 30 ml. of acetone and 50 mg. of p-toluenesulfonic acid is allowed to stand at room temperature for 15 hours. It is then poured into ice-water and extracted with ethyl acetate. These extracts are washed with water to neutrality, dried over sodium sulfate and evaporated to dryness. The residue is triturated with ether to yield ethyl 2-(6',10'-dioxoundec-1'-enyl)-4,6-dimethoxybenzoate which is recrystallized from acetone:hexane.

Similarly, ethyl 2-(6'-10'-dioxoundec-1'-enyl)-4,6-bistetrahydropyran-2'-yloxybenzoate is prepared from ethyl 2-(6',10'-bisethylenedioxyundec-1'-enyl) - 4,6 - bistetrahydropyran-2'-yloxy.

EXAMPLE 14

A solution of 30 mg. of ethyl 2-(6'-10'-dioxoundec-1'-enyl)-4,6-dimethoxybenzoate in 2 ml. of methanol is treated with 50 mg. of sodium borohydride. After 30 minutes the excess borohydride is destroyed with acetone and the solvent is evaporated in vacuo. Water is added to the residue and the product is extracted with ether. Chromatography on silica gel gives ethyl 2-(6',10'-dihydroxyundec-1'-enyl)-4,6-dimethoxybenzoate.

A solution of 22 mg. of the above prepared diol compound in 150 ml. of dry benzene containing 2 mg. of sodium hydride (50% dispersion in oil) is slowly distilled during 2 hours (50 ml. of distillate is collected). Addition of water, separation of the benzene layer, and evaporation gives ethyl 2-(2',6'-oxido-10'-hydroxyundecyl)-4,6-dimethoxybenzoate.

Similarly, methyl 2-(2',6'-oxido-10'-hydroxyundecyl)-4,6-bistetrahydrofuran-2'-yloxybenzoate is prepared from methyl 2 - (6',10'-dioxoundec-1'-enyl)-4,6-bistetrahydrofuran-2'-yloxybenzoate.

EXAMPLE 15

A solution of 107 mg. of ethyl 2-(6'-10'-dihydroxyundec-1'-enyl)-4,6-dimethoxybenzoate in 400 ml. of dry toluene containing 11 mg. of sodium hydride (50% dispersion in oil) is distilled during 26 hours with collection of 100 ml. of distillate. Excess acetic acid is added to the cooled solution followed by evaporation in vacuo. The benzene soluble part of the residue is purified by preparative thin layer chromatography, yielding 2-(2',6'-oxido 10'-hydroxyundecyl)-2,4-dimethoxybenzoic acid-10'-lactone.

Similarly, 2-(2',6'-oxido-10'-hydroxyundecyl)-2,4-dicyclopentoxy-benozic acid-10'-lactone;
2-(2',6'-oxido-10'-hydroxyundecyl)-2,4-bistertrahydro-pyran-2'-yloxybenzoic acid-10'-lactone;
2-(2',6'-oxido-10'-hydroxydodecyl)-2,4-dipropoxybenzoic acid-10'-lactone;
2-(2',6'-oxido-10'-hydroxyundecyl)-4,5-benzobenzoic acid-10'-lactone;
2-(2',6'-oxido-10'-hydroxy-11'-methyldodecyl)-benzoic acid-10'-lactone;
2-(2',6'-oxido-10'-hydroxytridecyl)-4,6-bisbenzyloxy-benzoic acid-10'-lactone; and
2-(2'6'-oxido-10'-hydroxyundecyl)-2,4-bistetrahydro-furan-2'-yloxybenzoic acid-10'-lactone are prepared from ethyl 2-(6',10'-dihydroxyundec-1'-enyl)-4,6-dicyclopent-oxybenzoate;
metyhl 2-(6',10'-dihydroxyundec-1'-enyl)-4,6-bistetra-hydropyran-2'-yloxybenzoate;
ethyl-(6',10'-dihydroxydodec-1'-enyl)-2,4-dipropoxy-benzoate;
methyl 2-(6',10'-dihydroxyundec-1'-enyl)-4,5-benzobenzoate;
methyl 2-(6',10'-dihydrovy-11'-methyldodec-1'-enyl)-benzoate;
ethyl 2-(6',10'-dihydroxytridec-1'-enyl)-4,6-bisbenzyloxybenzoate; and
ethyl -(6',10'-dihydroxyundec-1'-enyl)-2,4-bistetra-hydrofuran-2'-yloxybenzoate.

Similarly, 2 - (2',6'-oxido-10'-hydroxyundecyl)-2,4-dihydroxybenzoic acid-10'-lactone is prepared from 2-(2',6'- oxido - 10' - hydroxyundecyl)-2,4-dimethoxybenzoic acid-10'-lactone, via the hydrolysis process of Example 8.

EXAMPLE 16

Step A

A mixture of 0.5 g. of methyl 2-(6',6'-ethylenedioxy-10' - hydroxyundec - 1' - enyl) - 4,6 - dimethoxybenzoate (prepared via the process of Step B of Example 3) in 25 ml of acetone and 0.1 ml. of concentrated hydrochloric acid is allowed to stand at room temperature for 15 hours and is then poured into water. This mixture is extracted with methylene chloride, and the extracts are washed with water to neutrality, dried over sodium sulfate and evaporated to dryness, to yield methyl 2-(6'-oxo-10'-hydroxyundec - 1' - enyl)-4,6-dimethoxybenzoate which may be recrystallized from acetone:hexane.

Step B

A solution of 500 mg. of methyl 2-(6'-oxo-10'-hydroxyundec-1'-enyl)-4,6-dimethoxybenzoate and 15 g. of potassium hydroxide in 150 ml. of dimethyl sulfoxide is heated at 75° C. under nitrogen for 4 hours. The solution is acidified with dilute hydrochloric acid, diluted with water, and extracted with dichloromethane. Evaporation of the solvent gives 2-(6'-oxo-10'-hydroxyundec-1'-enyl)-4,6-dimethoxybenzoic acid.

Likewise, 2- (6' - oxo - 10'-hydroxyundec-1'-enyl)-4,6-dihydroxybenzoic acid is obtained via the process of the above step from methyl 2-(6'-oxo-10'-hydroxyundec-1'-enyl)-4,6-dihydroxybenzoate.

Step C

A solution of 100 mg. of 2-(6'-oxo-10'-hydroxyundec-1'-enyl)-2,4-dimethoxybenzoic acid and 2 ml. of 48% hydrogen bromide-glacial acetic acid mixture is refluxed for 1 hour, the mixture is added to sodium bicarbonate solution at 0° C., and the product is extracted with ether. Thin layer chromatography and crystallization from acetone:hexane give 2-(6'-oxo-10'-hydroxyundec-1'-enyl)-4,6-dihydroxybenzoic acid.

Similarly, by utilizing methyl 2-(6'-oxo-10'-hydroxyundec-1'-enyl)-4,6-dimethoxybenzoate in Step C of the above process, methyl 2-(6'-oxo-10'-hydroxyundec-1'-enyl)-4,6-dihydroxybenzoate is obtained.

What is claimed is:
1. Compounds of the formula:

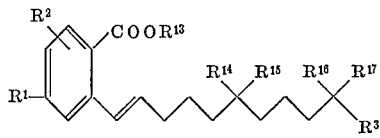

in which each of $R^1$ and $R^2$ (at position C–6) is hydrogen, hydroxy, alkoxy, cyclopentoxy, benzyloxy, or hydrocarbon carboxylic acyloxy of less than 12 carbon atoms; or
$R^1$ and $R^2$ (at position C–5) taken together are 4,5-benzo;
$R^3$ is (lower) alkyl;
$R^{13'}$ is hydrogen or (lower)alkyl;
one of $R^{14}$ and $R^{15}$ is hydrogen and the other is hydroxy; or $R^{14}$ and $R^{15}$ when taken together are =O; one of $R^{16}$ and $R^{17}$ is hydrogen and the other is hydroxy; or $R^{16}$ and $R^{17}$ taken together are =O; provided, when one of $R^{14}$ and $R^{15}$ is hydroxy, one of $R^{16}$ and $R^{17}$ is hydroxy; or when $R^{14}$ and $R^{15}$ taken taken together are =O, one of $R^{16}$ and $R^{17}$ is hydroxy of $R^{16}$ and $R^{17}$ taken together are =O.

2. The compound to claim 1 wherein it is 2-(6-keto-10'-hydroxyundec-1'-enyl)-4,6-dimethoxy benzoic acid and the methyl ester thereof.

3. The compounds according to claim 1 wherein it is 2 - (6' - keto - 10' - hydroxyundec-1'-enyl)-4,6-dihydroxybenzoic acid and the methyl ester thereof.

References Cited

UNITED STATES PATENTS 3,239,341    3/1966    Hodge et al. _____ 424—279
3,239,356    3/1966    Hodge et al. _____ 424—279

LORRAINE A. WEINBERGER, Primary Examiner

R. S. WEISSBERG, Assistant Examiner

U.S. Cl. X.R.

260—340.2, 340.9, 343, 345.8, 347.4, 468, 469, 476, 479, 482, 483, 487, 520, 521

UNITED STATES PATENT OFFICE
CERTIFICATE OF CORRECTION

Patent No. 3,562,313            Dated February 9, 1971

Inventor(s) Cross, Alexander D.; Fried, John H.; and Harrison, Ian T.

It is certified that error appears in the above-identified patent and that said Letters Patent are hereby corrected as shown below:

Column 2, lines 6 through 15, the formula should appear as follows:

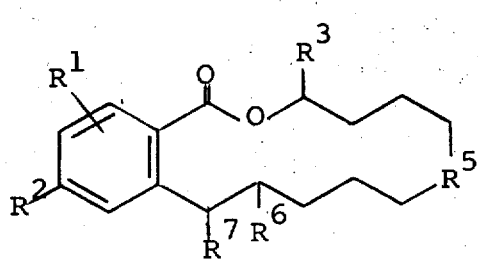

(I)

Column 3, in Scheme A, formula (IIIk) should appear as follows:

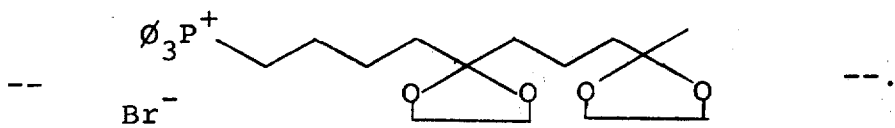

(IIIk)

UNITED STATES PATENT OFFICE
CERTIFICATE OF CORRECTION

Patent No. 3,562,313          Dated February 9, 1971

Inventor(s) Cross, Alexander D.; Fried, John H.; and Harrison, Ian T.

It is certified that error appears in the above-identified patent and that said Letters Patent are hereby corrected as shown below:

Column 6, in Scheme C, formula (XII) should appear as follows:

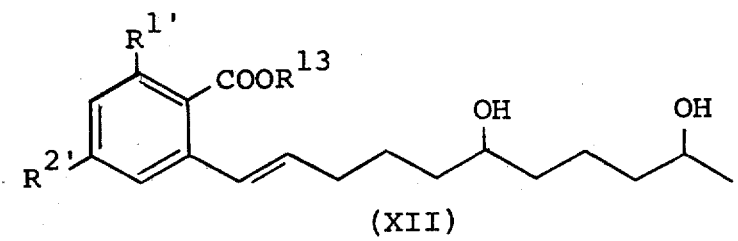

(XII)

Claim 1, in the structural formula as depicted, the group "$COOR^{13}$" should read --$COOR^{13'}$--

Signed and sealed this 7th day of March 1972.

(SEAL)
Attest:

EDWARD M. FLETCHER, JR.        ROBERT GOTTSCHALK
Attesting Officer               Commissioner of Patents